Figure 1:
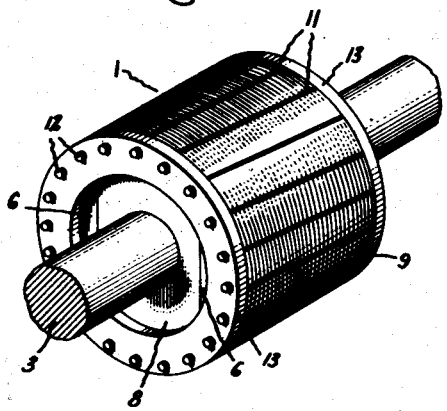

Inventor:
Frank W. Merrill,
by *Crowell S. Mack*
His Attorney.

Patented Oct. 10, 1950

2,525,456

UNITED STATES PATENT OFFICE 2,525,456

ROTOR FOR DYNAMOELECTRIC MACHINES

Frank W. Merrill, Fort Wayne, Ind., assignor to General Electric Company, a corporation of New York Application June 1, 1949, Serial No. 96,584

6 Claims. (Cl. 172—120)

This invention relates to rotors for dynamoelectric machines, and more particularly to rotors for synchronous induction motors having permanent magnet excitation with means for preventing demagnetization of the permanent magnet due to alternating flux from the stator winding at speeds other than synchronous.

Conventional synchronous motors are normally provided with a rotor having a certain number of direct current excited poles, the pole faces of which are usually supplied with squirrel cage bars and end rings to effect self-starting and to dampen hunting. In motors of fractional horsepower frame sizes, however, it is often physically inconvenient to provide salient direct current excited poles, and accordingly, such motors may be provided with permanent magnet excited rotors as shown in Patent 2,303,893 to Friedrich Mullner and application Serial No. 96,585, filed June 1, 1949, now Patent No. 2,519,895, of Martin A. Edwards and Frank W. Merrill, both assigned to the assignee of the present application. Such motors include a stator member with a winding energized by alternating current and a rotor member having a permanent magnet surrounded by a laminated sleeve. Slots are provided in the outer surface of the sleeve in which squirrel cage bars are positioned, the bars being short-circuited by end rings forming a short circuited winding for self-starting.

At speeds other than synchronous, the alternating flux produced by the stator winding tends to demagnetize the permanent magnet. In addition, there is a further demagnetizing effect on the permanent magnet due to stator flux changes caused by sudden variations in the load or energizing voltage. The short-circuited squirrel cage winding has some dampening effect on these demagnetizing forces which may be sufficient to protect the permanent magnet. However, it has been found desirable to supplement and increase the protective action of the squirrel cage by providing additional means for dampening the alternating flux produced by the stator winding at speeds other than synchronous or stator flux changes caused by variations in the external magnetic circuit.

An object of this invention is to provide an improved permanent magnet excited rotor for dynamoelectric machines.

Another object of this invention is to provide an improved permanent magnet rotor for synchronous induction motors with means for preventing demagnetization of the permanent magnet.

A further object of this invention is to provide an improved permanent magnet excited rotor for synchronous induction motors wherein demagnetization of the magnet due to alternating flux at speeds other than synchronism, or stator flux changes due to variations in the external magnetic circuit, is prevented and the most efficient use is made of the permanent magnet material.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, there is provided a permanent magnet excited rotor for a synchronous induction motor having a conventional stator member with appropriate windings thereon adapted to be energized by alternating current. The rotor comprises a permanent magnet mounted on a shaft formed of magnetic material. The magnet is polarized radially to respectively form polar areas at its outer surface and a coil of conductive material is arranged around the magnet intermediate the polar areas. A laminated sleeve member is arranged around the permanent magnet and the conductive coil and is provided with a plurality of slots in its outer surface in which a squirrel cage winding is positioned. By virtue of the squirrel cage winding, a motor provided with this rotor will start as an induction motor; however, the permanent magnet core will cause it to pull into step and run as a synchronous motor. The coil of conductive material around the magnet intermediate the polar areas dampens the alternating flux produced by the stator winding when the rotor is not running in synchronism and the stator flux changes due to variations in the external magnetic circuit, thus, preventing demagnetization of the magnet.

Figure 2:
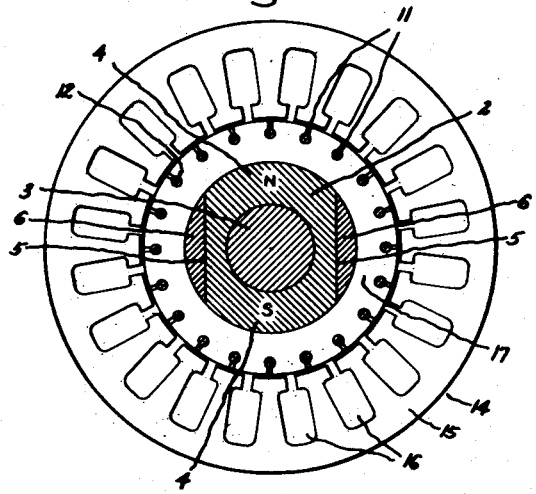
Figure 3:
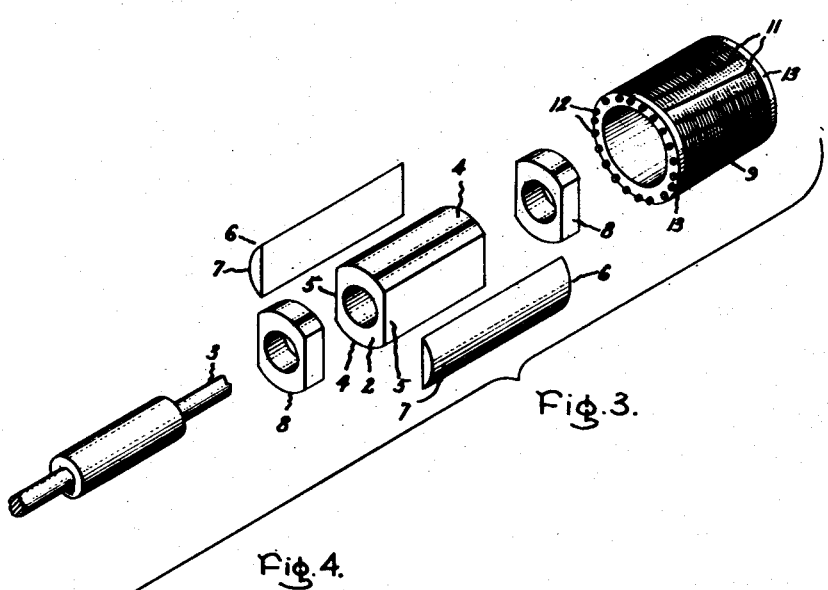
Figure 4:
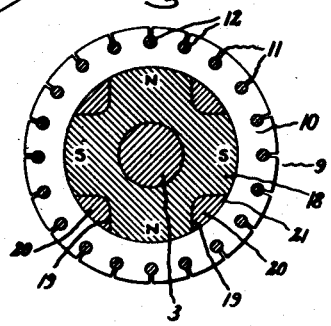

In the drawing, Fig. 1 is a perspective view illustrating the improved permanent magnet excited rotor of this invention; Fig. 2 is a cross-sectional view showing the rotor of Fig. 1 positioned in a stator member; Fig. 3 is an exploded view in perspective illustrating the assembly of the improved rotor of Fig. 1; and Fig. 4 is a cross-sectional view illustrating the application of the improved permanent magnet rotor construction of this invention to a 4 pole permanent magnet.

Referring now to Figs. 1, 2, and 3, there is shown a rotor member 1 having a permanent magnet 2, preferably formed of a permanent magnet alloy of iron, nickel, cobalt, copper, titanium and aluminum. The permanent magnet 2 is mounted on a shaft 3 formed of magnetic material, such as steel, and has two diametrically opposite arcuate longitudinal surfaces 4 and two parallel substantially flat longitudinal surfaces 5, the flat surfaces 5 being formed along a chord of the circle of the arcuate surfaces 4, as shown in Fig. 2. The permanent magnet 2 is polarized radially to form polar areas at the surfaces 4, as shown in Fig. 2. A pair of bars 6 formed of conductive material, such as copper, are respectively positioned abutting the sides 5 of the permanent magnet and are provided with arcuate outer surfaces 7. Thus, the outer surfaces 7 of the conductive bars 6 form with the curved surfaces 4 of the permanent magnet 2 a cylindrical core structure. A pair of end plates 8 formed of conductive material are provided having a cross-sectional configuration substantially identical to the permanent magnet 2. The end plates 8 are press fitted over the shaft member 3, respectively abutting either end of the permanent magnet 2, and also abut the ends of the conductive bars 6, which project beyond the ends of the magnet 2. End plates 8 may also be soldered to bars 6. A cylindrical laminated sleeve member 9, formed of a plurality of relatively thin laminations 10 of magnetic material, is pressed over the cylindrical core structure comprising the permanent magnet 2, the side bars 6 and the end plates 8. The sleeve member 9 is provided with a plurality of longitudinal slots 11 in its outer surface and a plurality of squirrel cage bars 12 of conductive material, such as aluminum, are positioned therein. A pair of conductive end rings 13 are provided to connect the squirrel cage bars 12 to form a short-circuited squirrel cage winding.

When the rotor 1, as described above, is positioned in a stator member 14 of any conventional type, which may be provided with a yoke section 15 and a plurality of winding slots 16 in which appropriate windings (not shown) adapted to be energized by alternating current are positioned; the motor will be self-starting as an induction motor by virtue of the squirrel cage winding and will pull into step and run at synchronism as a synchronous motor on the uni-directional excitation provided by the permanent magnet 2.

It can be readily seen that the alternating flux produced by the stator windings will traverse the permanent magnet 2 and at speeds other than synchronous, will tend to demagnetize the magnet. In addition, stator flux changes caused by variations in load or line voltage tend to produce a demagnetizing effect on the magnet. The conductive bars 6 and the end plates 8 form a coil of conductive material around the permanent magnet 2 intermediate the polar areas and serve to dampen the demagnetizing effect of the alternating flux and changes in the external magnetic circuit. Furthermore, with this construction, the permanent magnet 2 can be formed so as to have a slide fit over the shaft 3, the torque drive from the shaft or to the shaft being transmitted through the bar and damping assembly 6 and 8. It has been found impractical to press brittle permanent magnet material over a shaft since it is subject to cracking. However, it is permissible to press the rotor assembly comprising the permanent magnet 2 and the damper assembly 6 and 8 into the sleeve member 9.

In the construction of a rotor member in accordance with Figs. 1, 2, and 3, it has been found desirable to fabricate the laminated sleeve member 9 so that the section 17 under the squirrel cage bars 12 is as radially thin as possible in order to produce a high initial flux density under the bars to secure synchronous rather than induction motor operation. Furthermore, the provision of the thin section 17 permits the use of the largest possible diameter permanent magnet 2. The width of the arcuate polar surface portions 4 circumferentially is preferably made to subtend approximately two-thirds of the pole pitch on the inside of the laminated sleeve member 9. A flux density of 95,000 to 125,000 lines per square inch in the section 17 produced by a flux density in the magnet of approximately 60,000 lines per square inch, following magnetization of the rotor but prior to its assembly in the stator, was found to be desirable. It was found that an initial density in the section 17 less than 95,000 lines per square inch caused the motor power to decrease rapidly while a density over 125,000 lines per square inch caused the pull-in torque to fall off, produced no further gain in pull-out torque, and the power factor and efficiency decreased. Furthermore, if the section 17 underneath the squirrel cage bars 12 was comparatively wide, a considerable portion of the permanent magnet flux would be short-circuited. However, the provision of a thin section 17 provides a path of high reluctance around the permanent magnet 2 so that a substantial part of the permanent magnet flux is diverted to the stator at synchronism, as described in the aforesaid application Serial No. 96,585.

The presence of the shaft 3 of magnetic material through the center of the permanent magnet 2 allows the main magnet flux to pass directly through the center of the shaft which has the effect of increasing the central magnet area by the projected shaft area. In addition, a permanent magnet of the configuration described above with the flat sides 5 is somewhat more desirable than a completely cylindrical magnet because of the reduced flux leakage from the high density interpolar ring section 17.

Referring now to Fig. 4 in which like elements are indicated by like reference numerals, there is shown a four pole permanent magnet 18, preferably formed of a permanent magnet alloy such as nickel, cobalt, copper, titanium, and aluminum. The permanent magnet 18 is mounted on a shaft 3 formed of magnetic material, such as steel, and is polarized radially to form four polar areas as shown. The interpolar areas 19 are cored out to effect saving of magnetic material and to accommodate bars 20. The bars 20 are formed of conductive material, such as copper, or aluminum and are provided with arcuate outer surfaces 21 which form with the curved polar faces 22 of the permanent magnet 18, a cylindrical core structure. A pair of end plates (not shown) formed of conductive material are provided having a cross-sectional configuration substantially identical to the permanent magnet 18. These end plates are press fitted over the shaft 3, respectively abutting either end of the permanent magnet 18, and serve to connect the ends of the conductive bars 20, in the manner shown in Fig. 3. A cylindrical laminated sleeve member 9 formed of a plurality of relatively thin laminations 10 of magnetic material is pressed over the cylindrical core structure comprising the permanent magnet 18, the conductive bars 20 and the end plates. The sleeve member 9 is provided with a plurality of longitudinal slots 11 in its outer surface and a plurality of squirrel cage bars 12 of conductive material, such as aluminum, are positioned therein. A pair of conductive end rings (not shown) are provided to connect the squirrel cage bars 12 to form a complete short-circuited squirrel cage winding.

It will be readily apparent that the conductive bars 20 and their associated end plates may be separate elements which are secured together to form a unitary structure, as by soldering, or the conductive bars 20 and end plates may be cast in place as an integral unit, either prior to assembly of the permanent magnet 18 into the laminated sleeve member 9 or at the time the squirrel cage bars 12 and end rings 13 are cast. It will also be seen that the construction is applicable to multipolar rotors having more than two pairs of poles. It will also be understood that the improved rotor construction of this invention may be utilized in a generator since the permanent magnet is protected against the demagnetizing effect of sudden changes in load by the dampening action of the squirrel cage winding and the conductive coil.

It will now be readily apparent that this invention provides an improved permanent magnet excited rotor for dynamoelectric machines wherein the alternating flux produced by the stator winding and the effect of changes in the external magnetic circuit are dampened to prevent demagnetization of the permanent magnet.

While I have illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of the invention.

What I claim as new and desire to secure by Letters Patent of the United States is:

1. In a synchronous induction motor having a stator member provided with a winding adapted to be energized by alternating current, a rotor comprising a permanent magnet polarized radially to form polar areas at its outer surface and apertured to receive a shaft, a shaft arranged in said permanent magnet aperture, a laminated sleeve member arranged around said permanent magnet and having a plurality of slots formed in its outer surface, a plurality of squirrel cage winding conductors respectively positioned in said slots, means short-circuiting said conductors, a pair of bars of conductive material respectively abutting the sides of said permanent magnet intermediate said polar areas, and a pair of end plates of conductive material respectively connecting said bars to form a coil of conductive material around said permanent magnet for preventing demagnetization of said magnet due to alternating flux produced by said stator winding when said rotor is not running in synchronism, said end plates being secured to said shaft for transmitting the driving torque thereto.

2. In a synchronous induction motor having a stator member provided with a winding adapted to be energized by alternating current, a rotor comprising a permanent magnet polarized radially to form polar areas at its outer surface and apertured to receive a shaft, a shaft arranged in said permanent magnet aperture, said permanent magnet having two parallel substantially flat longitudinal sides intermediate said polar areas, a pair of bars of conductive material respectively abutting said flat sides of said permanent magnet, a pair of end plates of conductive material respectively connecting the ends of said bars, a laminated sleeve member surrounding said permanent magnet and said bars and having a plurality of slots formed in its outer surface, a plurality of squirrel cage winding conductors respectively positioned in said slots and means for short-circuiting said conductors, said bars and said end plates forming a coil of conductive material around said permanent magnet for preventing demagnetization of said magnet due to alternating flux produced by said stator winding when said rotor is not running in synchronism, said end plates being secured to said shaft for transmitting the driving torque thereto.

3. In a synchronous induction motor having a stator member provided with a winding adapted to be energized by alternating current, a rotor comprising a permanent magnet having two diametrically opposite arcuate longitudinal surfaces and being apertured to receive a shaft, said permanent magnet being polarized radially to respectively form polar areas at said arcuate surfaces and having two parallel substantially flat longitudinal sides intermediate said polarized surfaces, each of said flat sides being formed along a chord of the circle of said arcuate surfaces, a shaft arranged in said permanent magnet aperture, a pair of bars of conductive material respectively abutting said flat surfaces, said bars having curved outer surfaces and forming with said permanent magnet a cylindrical structure, a pair of end plates of conductive material respectively connecting the ends of said bars, a cylindrical laminated sleeve member arranged around said permanent magnet and said bars and having a plurality of slots formed in its outer surface, a plurality of squirrel cage winding conductors respectively positioned in said slots and means for short-circuiting said conductors, said bars and said end plates forming a coil of conductive material around said permanent magnet for preventing demagnetization of said magnet due to alternating flux produced by said stator winding when said rotor is not running in synchronism, said end plates being secured to said shaft for transmitting the driving torque thereto.

4. In a synchronous induction motor having a stator member provided with a winding adapted to be energized by alternating current, a rotor including a permanent magnet polarized radially to form a plurality of pairs of polar areas and apertured to receive a shaft, a shaft arranged in said permanent magnet aperture, bars of conductive material respectively abutting the sides of said permanent magnet intermediate said polar areas, a pair of end plates of conductive material respectively connecting the ends of said bars, a cylindrical laminated sleeve member arranged around said permanent magnet and said bars and having a plurality of slots formed in its outer surface, a plurality of squirrel cage winding conductors respectively positioned in said slots with means for short-circuiting said conductors to form a squirrel cage winding, said bars and said end plates forming a coil of conductive material around said permanent magnet for preventing demagnetization of said magnet due to alternating flux produced by said stator winding when said rotor is not running in synchronism, said end plates being secured to said shaft for transmitting the driving torque thereto.

5. In a synchronous induction motor having a stator member provided with a winding adapted to be energized by alternating current, a rotor including a permanent magnet polarized radially to form a plurality of pairs of polar areas at its outer surface with the interpolar areas being cored out and being apertured to receive a shaft, a shaft arranged in said permanent magnet aperture, bars of conductive material respectively positioned in said cored out interpolar areas and having curved outer surfaces forming with said permanent magnet a cylindrical structure, a pair of end plates of conductive material respectively connecting the ends of said bars, a cylindrical laminated sleeve member arranged around said permanent magnet and said bars having a plurality of slots formed in its outer surface, a plurality of squirrel cage winding conductors respectively positioned in said slots with means for short-circuiting said conductors to form a squirrel cage winding, said bars and said end plates forming a coil of conductive material around said permanent magnet for preventing demagnetization of said magnet due to alternating flux produced by said stator winding when said rotor is not running in synchronism, said end plates being secured to said shaft for transmitting the driving torque thereto.

6. In a dynamoelectric machine having a stator member, a rotor comprising a permanent magnet polarized radially to form polar areas at its outer surface and apertured to receive a shaft, a shaft arranged in said permanent magnet aperture, bars of conductive material respectively abutting the sides of said permanent magnet intermediate said polar areas, a pair of end plates of conductive material respectively connecting said bars, a laminated sleeve member arranged around said permanent magnet and said bars and having a plurality of slots formed in its outer surface, a plurality of squirrel cage winding conductors respectively positioned in said slots, and means short-circuiting said conductors, said bars and said end plates forming a coil of conductive material around said permanent magnet for preventing demagnetization of said magnet due to flux variations in said stator, said end plates being secured to said shaft for transmitting torque to or from said shaft.

FRANK W. MERRILL.

REFERENCES CITED

The following references are of record in the file of this patent:

UNITED STATES PATENTS

| Number | Name | Date |
| --- | --- | --- |
| 2,078,805 | Merrill | Apr. 27, 1937 |
| 2,303,893 | Mullner | Dec. 1, 1942 |